(12) United States Patent
Ku et al.

(10) Patent No.: US 12,627,193 B2
(45) Date of Patent: May 12, 2026

(54) MOTOR

(71) Applicant: LG INNOTEK CO., LTD., Seoul (KR)

(72) Inventors: Ju Hwan Ku, Seoul (KR); Jae Young Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 200 days.

(21) Appl. No.: 18/286,795

(22) PCT Filed: Apr. 13, 2022

(86) PCT No.: PCT/KR2022/005365
§ 371 (c)(1),
(2) Date: Oct. 13, 2023

(87) PCT Pub. No.: WO2022/220591
PCT Pub. Date: Oct. 20, 2022

(65) Prior Publication Data
US 2024/0195261 A1     Jun. 13, 2024

(30) Foreign Application Priority Data
Apr. 13, 2021    (KR) ........................ 10-2021-0047810

(51) Int. Cl.
*H02K 5/173* (2006.01)
*F16C 35/04* (2006.01)
*H02K 7/08* (2006.01)

(52) U.S. Cl.
CPC ......... *H02K 5/1732* (2013.01); *F16C 35/042* (2013.01); *H02K 7/083* (2013.01); *F16C 2380/26* (2013.01)

(58) Field of Classification Search
CPC .... H02K 5/1732; H02K 7/083; F16C 35/042; F16C 2380/26
See application file for complete search history.

(56) References Cited

U.S. PATENT DOCUMENTS 4,048,530 A * 9/1977 Kaufman, Jr. ........... H02K 5/08
310/90

FOREIGN PATENT DOCUMENTS

| | | |
|---|---|---|
| DE | 10-2018-200865 | 7/2019 |
| DE | 102018200865 A1 * | 7/2019 ............... H02K 9/19 |
| KR | 10-2011-0010231 | 2/2011 |
| KR | 10-1188096 | 10/2012 |
| KR | 10-2013-0048827 | 5/2013 |
| KR | 10-2016-0089784 | 7/2016 |
| KR | 10-2020-0010524 | 1/2020 |

OTHER PUBLICATIONS

International Search Report dated Aug. 5, 2022 issued in Application No. PCT/KR2022/005365.
Korean Office Action dated Jul. 18, 2025 issued in Application No. 10-2021-0047810.

* cited by examiner

*Primary Examiner* — Terrance L Kenerly
(74) *Attorney, Agent, or Firm* — KED & ASSOCIATES

(57) ABSTRACT
A motor is provided that includes a shaft, a rotor coupled to the shaft, a stator disposed to correspond to the rotor, a bearing housing coupled to the shaft, and a bearing that supports the bearing housing. The rotor includes a rotor core and a magnet coupled to the rotor core. The bearing housing includes a first surface in contact with the bearing, a second surface in contact with the rotor core, and a third surface in contact with the shaft.

10 Claims, 10 Drawing Sheets

[FIG. 1]
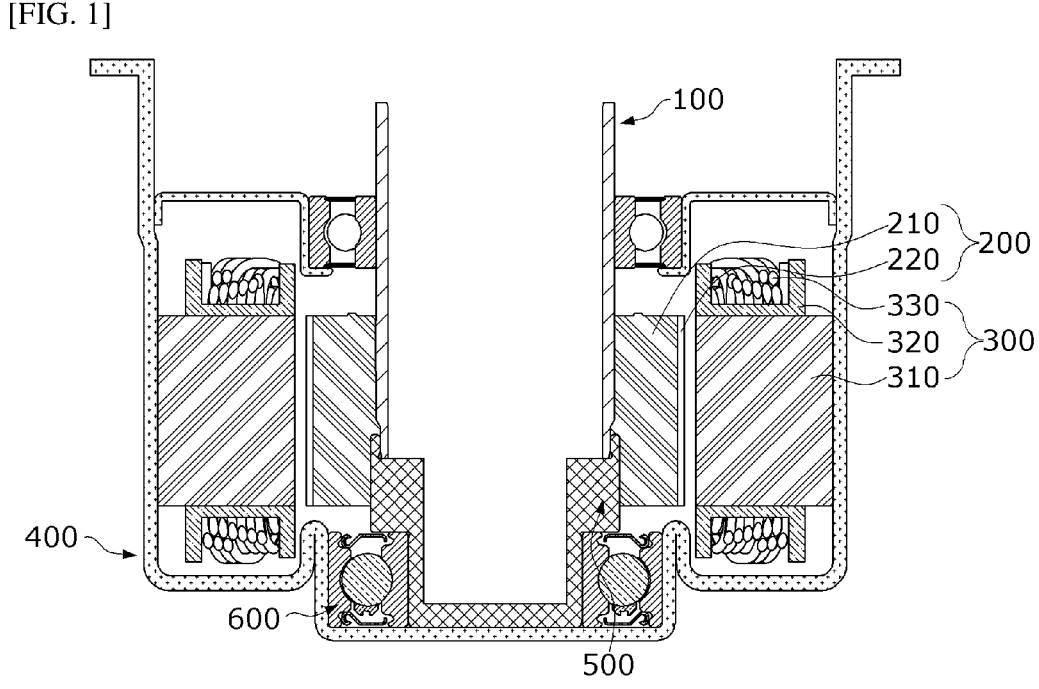

[FIG. 2]

[FIG. 3]
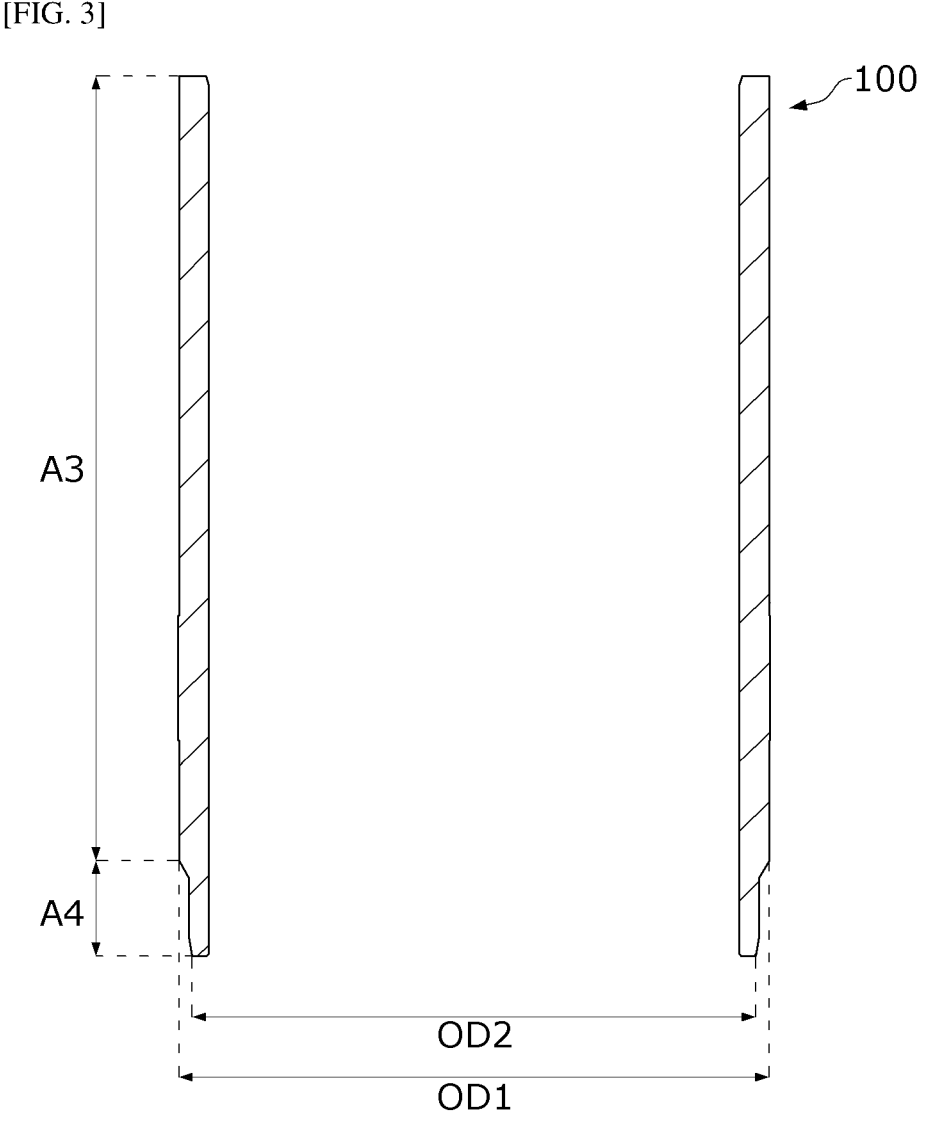

[FIG. 4]
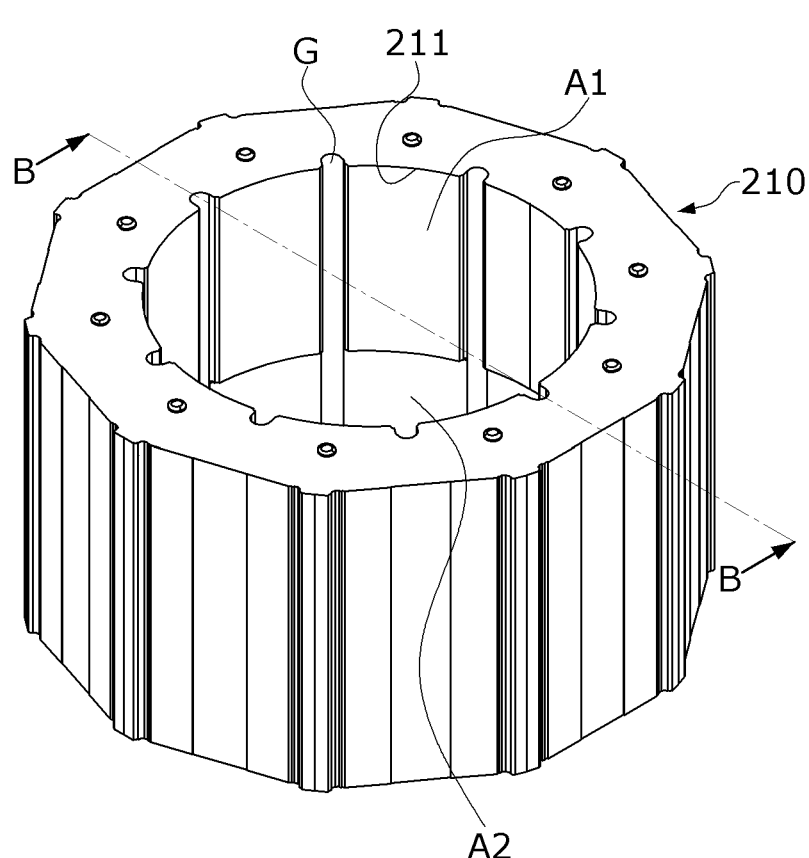

[FIG. 5]
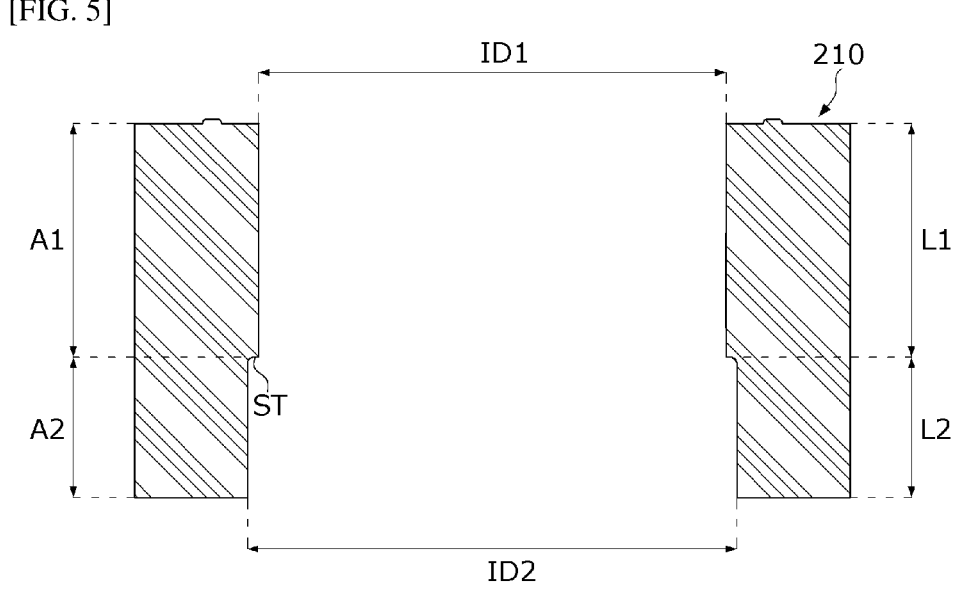

[FIG. 6]
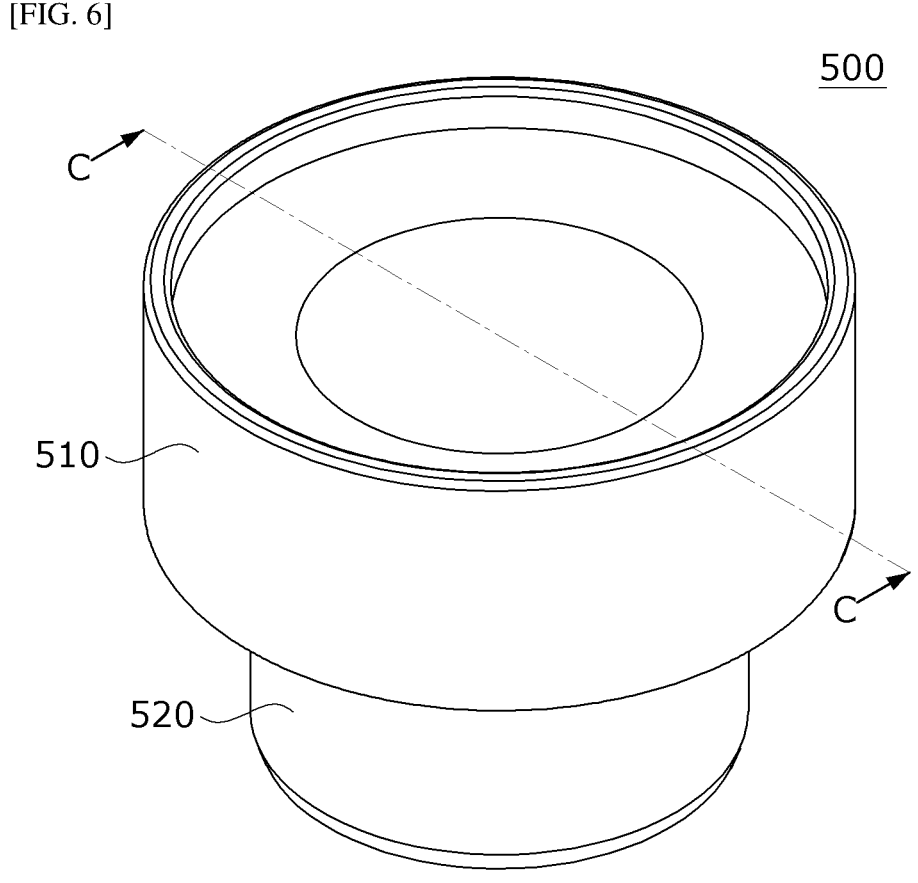

[FIG. 7]
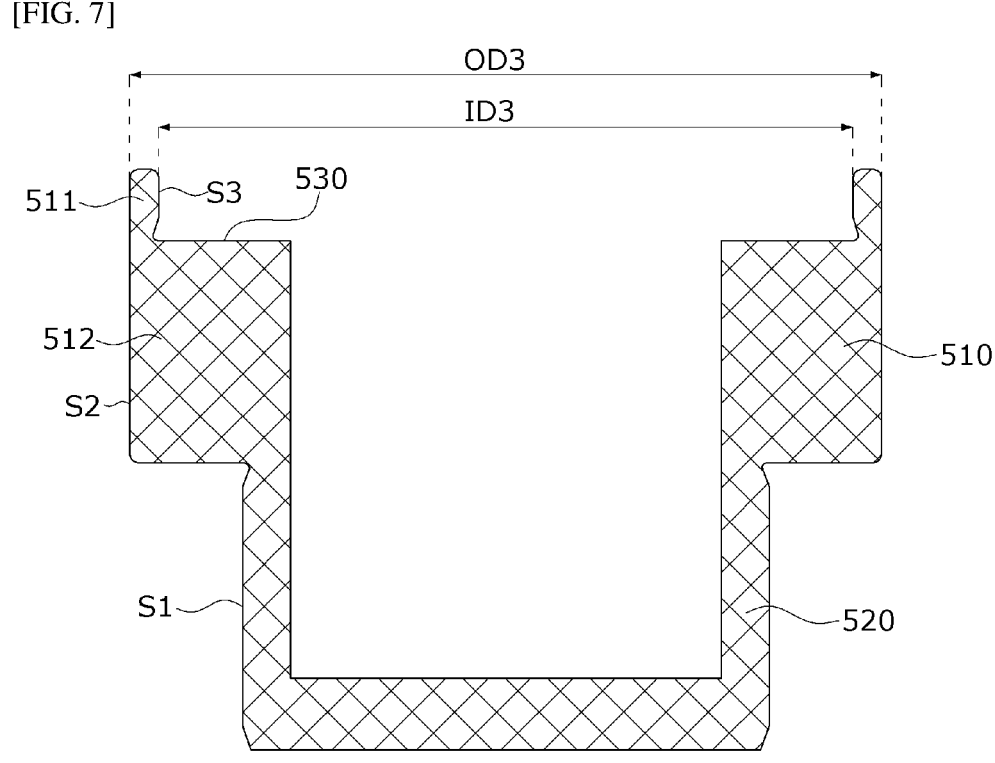

[FIG. 8]
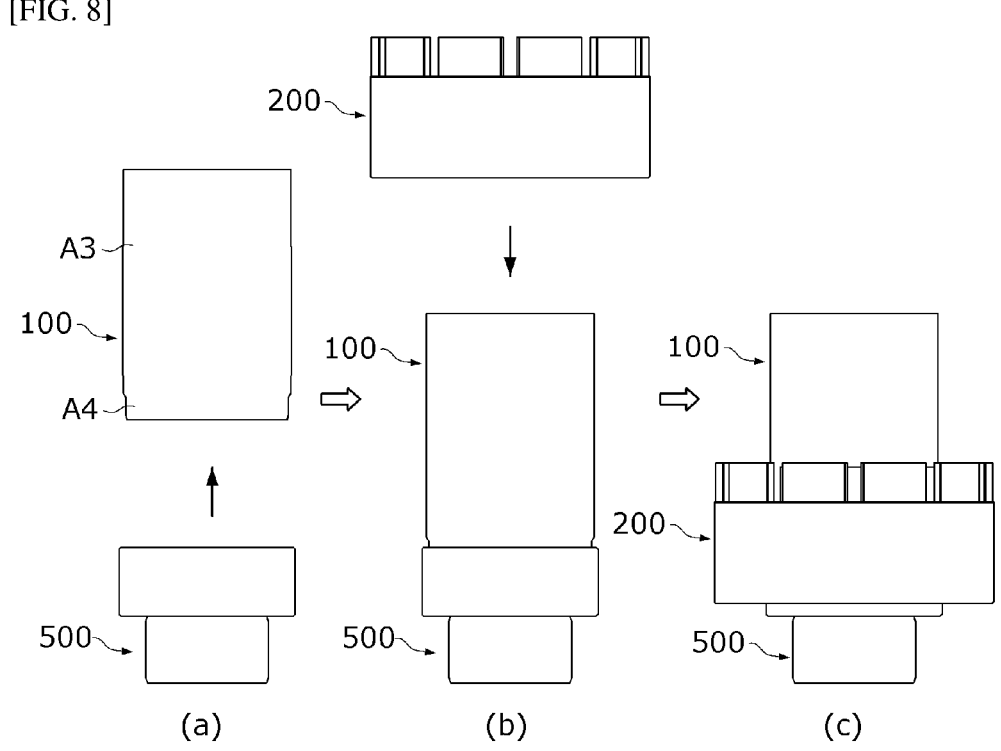
(a)                    (b)                    (c)

[FIG. 9]
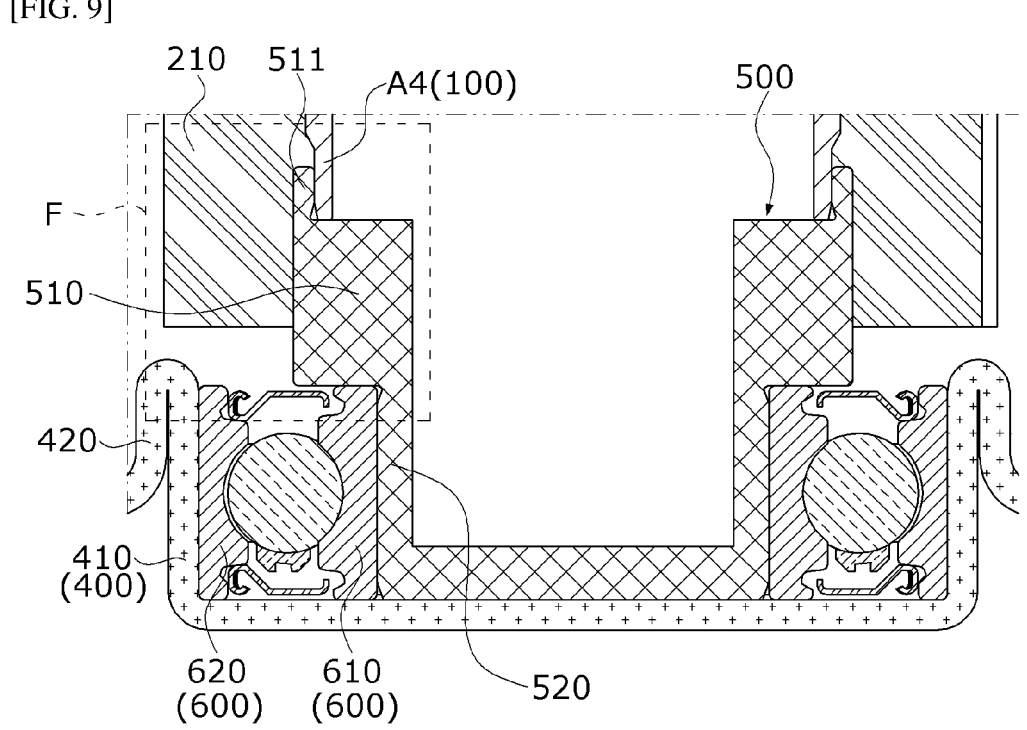

[FIG. 10]
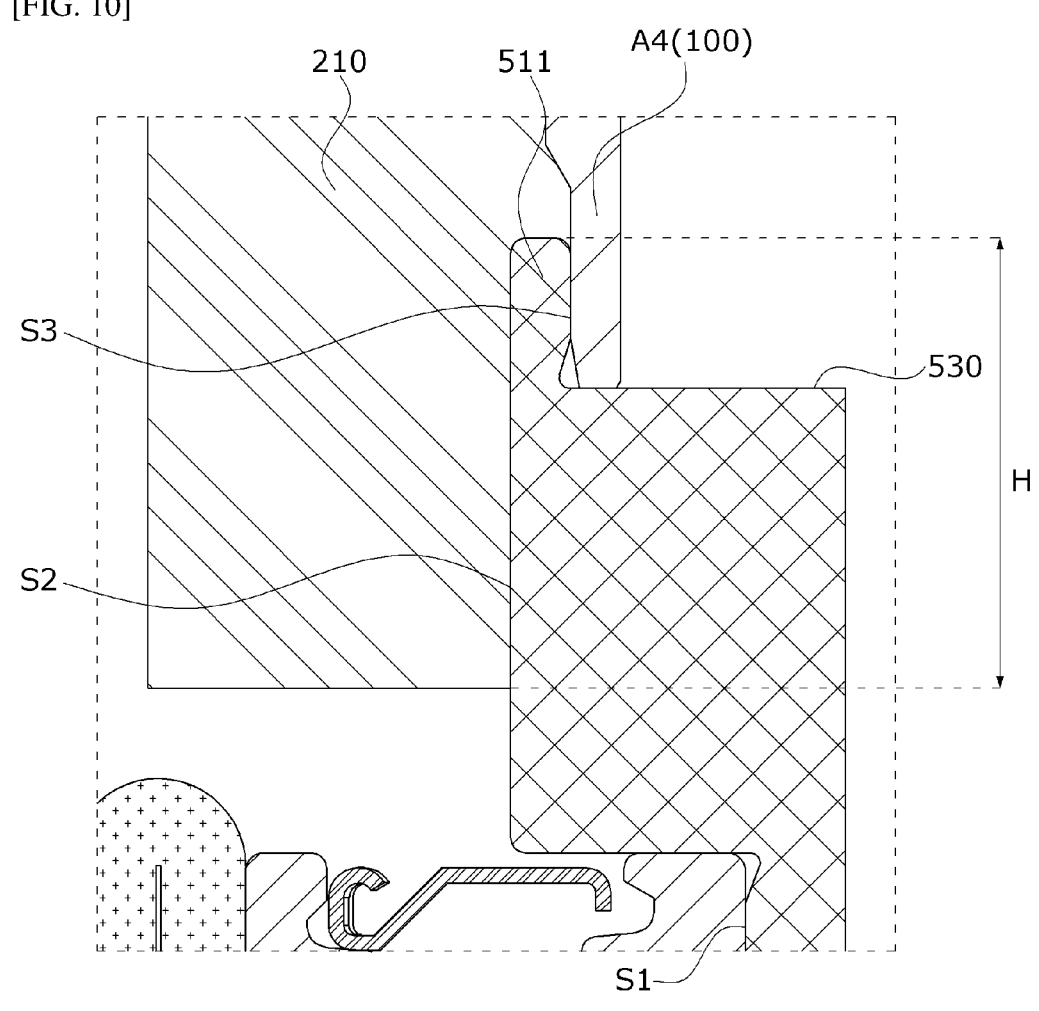

MOTOR

CROSS-REFERENCE TO RELATED PATENT APPLICATIONS

This application is a U.S. National Stage Application under 35 U.S.C. § 371 of PCT Application No. PCT/KR2022/005365, filed Apr. 13, 2022, which claims priority to Korean Patent Application No. 10-2021-0047810, filed Apr. 13, 2021, whose entire disclosures are hereby incorporated by reference.

TECHNICAL FIELD

The present invention relates to a motor.

BACKGROUND ART

A motor includes a shaft, a rotor, and a stator. The rotor and the stator are accommodated in a housing. The stator may include a stator core and a coil wound around the stator core.

The shaft may be a hollow member. Bearings which support the shaft may support one side and the other side of the shaft. In this case, one side of the shaft may be coupled to a bearing housing, and the bearings may support the bearing housing.

Since one side of the shaft is coupled to the bearing housing, there is a problem of a limitation in reducing the size of the motor in an axial direction.

DISCLOSURE

Technical Problem

Accordingly, the present invention is directed to providing a motor of which a size is reduced in an axial direction.

Technical Solution

One aspect of the present invention provides a motor including a shaft, a rotor coupled to the shaft, a stator disposed to correspond to the rotor, a bearing housing coupled to the shaft, and a bearing which supports the bearing housing, wherein the rotor includes a rotor core and a magnet coupled to the rotor core, and the bearing housing includes a first surface in contact with the bearing, a second surface in contact with the rotor core, and a third surface in contact with the shaft.

Another aspect of the present invention provides a motor including a shaft, a rotor coupled to the shaft, a stator disposed to correspond to the rotor, a bearing housing coupled to the shaft, and a bearing which supports the bearing housing, wherein the rotor includes a rotor core and a magnet coupled to the rotor core, the rotor core includes a first region having a first inner diameter and a second region having a second inner diameter greater than the first inner diameter, the shaft includes a first region having a first outer diameter and a second region having a second outer diameter smaller than the first outer diameter, and the bearing housing includes an end portion disposed between the second region of the rotor core and the second region of the shaft.

Still another aspect of the present invention provides a motor including a shaft, a rotor coupled to the shaft, a stator disposed to correspond to the rotor, a bearing housing coupled to the shaft, and a bearing which supports the bearing housing, wherein the rotor includes a rotor core and a magnet coupled to the rotor core, the bearing housing includes an insertion region inserted between the shaft and the rotor core, and the insertion region overlaps the shaft in an axial direction and does not overlap the bearing in a direction perpendicular to the axial direction.

Yet another aspect of the present invention provides a motor including a shaft, a rotor coupled to the shaft, a stator which is disposed to correspond to the rotor and includes a coil, a bearing housing coupled to the shaft, and a bearing which supports the bearing housing, wherein the rotor includes a rotor core and a magnet coupled to the rotor core, the bearing housing is disposed between the rotor core and the shaft, and the bearing is disposed between the bearing housing and the coil.

Advantageous Effects

According to an embodiment, since a part of a bearing housing is positioned inside a rotor core, there is an advantage of reducing a size of a motor in an axial direction.

According to an embodiment, since a bearing housing is in contact with a stopper disposed on an inner circumferential surface of a rotor core, there is an advantage of precisely setting a position of the rotor core in an axial direction when the rotor core and a shaft are assembled.

According to an embodiment, an outer surface of a bearing housing is used as a region which is fitted to a rotor core and supports a bearing, and an inner surface of the bearing housing is used as a structure which supports a spindle of an external device.

DESCRIPTION OF DRAWINGS

FIG. 1 is a view illustrating a motor according to an embodiment.

FIG. 2 is a view illustrating a shaft illustrated in FIG. 1.

FIG. 3 is a side cross-sectional view illustrating the shaft along line A-A of FIG. 2.

FIG. 4 is a view illustrating a rotor core illustrated in FIG. 1.

FIG. 5 is a side cross-sectional view illustrating the shaft along line B-B of FIG. 4.

FIG. 6 is a view illustrating a bearing housing.

FIG. 7 is a side cross-sectional view illustrating the bearing housing along line C-C of FIG. 6.

FIG. 8(*a*) to (*c*) are a set of views illustrating an assembly process of the shaft and a rotor.

FIG. 9 is a side cross-sectional view illustrating a portion around the bearing housing of the motor.

FIG. 10 is an enlarged view illustrating a region indicated by F of FIG. 9.

MODES OF THE INVENTION

A direction parallel to a longitudinal direction (vertical direction) of a shaft is referred to as an axial direction, a direction perpendicular to the axial direction of the shaft is referred to as a radial direction, and a direction along a circle having a radius in the radial direction about the shaft is referred to as a circumferential direction.

FIG. 1 is a view illustrating a motor according to an embodiment.

Referring to FIG. 1, a motor according to the embodiment may include a shaft 100, a rotor 200, a stator 300, and a housing 400. Hereinafter, the term "inward" is a direction from a housing 400 toward the shaft 100 which is a center of the motor, and the term "outward" is a direction opposite to "inward," which is, a direction from the shaft 100 toward the housing 400. In addition, a radial direction is defined based on an axial center of the shaft 100.

The shaft 100 may be coupled to the rotor 200. When an electromagnetic interaction occurs between the rotor 200 and the stator 300 due to a supplied current, the rotor 200 rotates, and the shaft 100 rotates in conjunction with the rotation of the rotor 200. The shaft 100 may be a hollow member. A spindle of an external device may enter an inner side of the shaft 100.

The rotor 200 rotates through an electrical interaction with the stator 300. The rotor 200 may be disposed inside the stator 300.

The stator 300 is disposed outside the rotor 200. The stator 300 may include a stator core 310, an insulator 320 mounted on the stator core 310, and a coil 330. The coil 330 may be wound around the insulator 320. The insulator 320 is disposed between the coil 330 and the stator core 310 to serve to electrically insulate the stator core 310 and the coil 330 from each other. The coil 330 induces an electrical interaction with a magnet of the rotor 200.

The stator 300 and the rotor 200 are disposed inside the housing 400. In addition, a bearing housing 500 is disposed inside the housing 400.

The bearing housing 500 serves to support both a bearing 600 and the spindle entering the inner side of the shaft 100. The bearing housing 500 is coupled to an end portion 120 of the shaft 100. The bearing housing 500 is disposed around a bottom surface of the housing 400. The bearing housing 500 is in contact with an inner ring 610 (see FIG. 8) of the bearing 600.

The bearing 600 is fixed to the housing 400. In addition, the bearing 600 rotatably supports the bearing housing 500.

Figure 2:
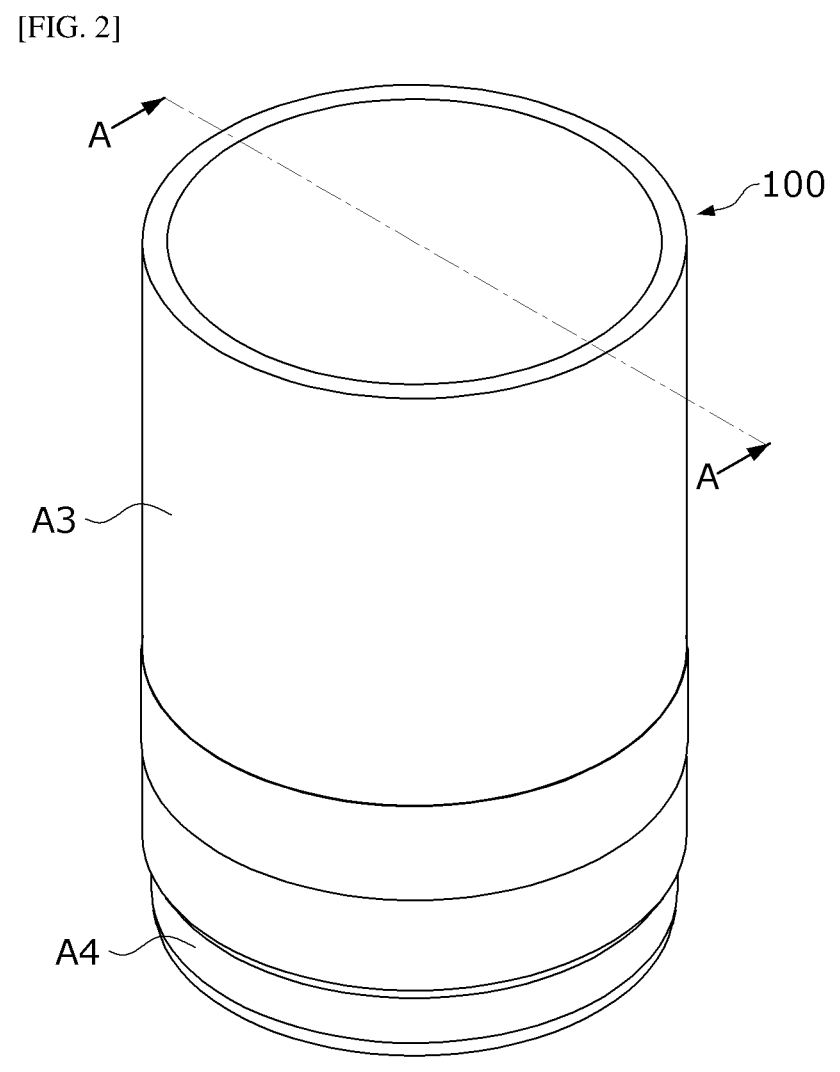

FIG. 2 is a view illustrating the shaft 100 illustrated in FIG. 1, and FIG. 3 is a side cross-sectional view illustrating the shaft 100 along line A-A of FIG. 2.

Referring to FIGS. 2 and 3, the shaft 100 may include a third region A3 and a fourth region A4 which have different outer diameters. The fourth region A4 is disposed on an end portion of the third region A3 in an axial direction. The third region A3 has a first outer diameter OD1, and the fourth region A4 has a second outer diameter OD2 which is smaller than the first outer diameter OD1. Accordingly, an outer circumferential surface of the third region A3 and an outer circumferential surface of the fourth region A4 may be disposed to be stepped. The third region A3 is a region to which a rotor core 210 is fitted, and the fourth region A4 is a region in contact with the bearing housing 500. The spindle of the external device may enter and be positioned in the inner side of the sharp 100.

FIG. 4 is a view illustrating the rotor core 210 illustrated in FIG. 1, and FIG. 5 is a side cross-sectional view illustrating the shaft 100 along line B-B of FIG. 2.

Referring to FIGS. 4 and 5, a hole 211 passing through the rotor core 210 in an axial direction may be disposed in a central portion of the rotor core 210. The shaft 100 is disposed in the hole 211. The rotor core 210 may include a plurality of grooves G disposed in an inner circumferential surface of the rotor core 210. The grooves G may be concavely formed in the inner circumferential surface of the rotor core 210 in the axial direction. The plurality of grooves G may be disposed at equal intervals in a circumferential direction of the rotor core 210.

The rotor core 210 may include a first region A1 and a second region A2 which are distinguished in the axial direction. The first region A1 has a first inner diameter ID1, and the second region A2 has a second inner diameter ID2. Accordingly, an inner circumferential surface of the first region A1 and an inner circumferential surface of the second region A2 may be disposed to be stepped to form a stopper ST. Accordingly, the stopper ST is in contact with an end portion 511 of the bearing housing 500 and serves to determine a position of the rotor core 210 in the axial direction by limiting an insertion depth of an insertion region of the bearing housing 500 when the rotor core 210 and the bearing housing 500 are assembled.

The inner circumferential surface of the first region A1 is a region in contact with an outer circumferential surface of the shaft 100, and the inner circumferential surface of the second region A2 corresponds to a region in contact with the bearing housing 500. As the second region A2 is disposed to be stepped with respect to the first region A1, a space for the bearing housing 500 to be disposed inside the rotor core 210 is secured. Meanwhile, a length L1 of the first region A1 in the axial direction may be greater than an axial length L2 of the second region A2 in the axial direction. When the length L1 of the first region A1 in the axial direction is smaller than the length L2 of the second region A2 in the axial direction, since a coupling force of the rotor core 210 and the shaft 100 may decrease, at least the length L1 of the first region A1 in the axial direction may be greater than the length L2 of the second region A2 in the axial direction.

FIG. 6 is a view illustrating the bearing housing 500, and FIG. 7 is a side cross-sectional view illustrating the bearing housing 500 along line C-C of FIG. 6.

Referring to FIGS. 6 and 7, the bearing housing 500 includes an outer surface and an inner surface. The outer surface of the bearing housing 500 may include a first surface S1 and a second surface S2. The first surface S1 is a surface in contact with the inner ring 610 (see FIG. 8) of the bearing 600 and may be a part of an outer circumferential surface of the bearing housing 500. The second surface S2 is a surface in contact with an inner circumferential surface of the shaft 100 and may be a part of the outer circumferential surface of the bearing housing 500.

The inner surface of the bearing housing 500 may include a third surface S3. The third surface S3 is a region in contact with the outer circumferential surface of the fourth region A4 of the shaft 100.

The bearing housing 500 may be distinguished into a first part 510 and a second part 520 in the axial direction. An outer circumferential surface of the first part 510 corresponds to the second surface S2. An outer circumferential surface of the second part 520 corresponds to the first surface S1. The first part 510 may include the end portion 511 and a step region 512. The end portion 511 corresponds to an insertion region inserted between the shaft 100 and the rotor core 210 in a radial direction. The end portion 511 may be disposed between the second region A2 of the rotor core 210 and the fourth region A4 of the shaft 100 in the radial direction.

Such an insertion region is disposed to overlap the shaft 100 in the axial direction and does not overlap the bearing in a direction perpendicular to the axial direction. In addition, the entire insertion region also does not overlap the bearing in a direction perpendicular to the axial direction.

An inner diameter ID3 of the end portion 511 is equal to the second outer diameter OD2 of the shaft 100. Accordingly, the end portion 511 may be fitted to an outer side of the shaft 100. An outer diameter OD3 of the end portion 511 is equal to the second inner diameter ID2 of the rotor core 210. Accordingly, the end portion 511 may be fitted to an inner side of the rotor core 210.

The step region 512 extends form the end portion 511. An outer diameter of the step region 512 is equal to the outer diameter OD3 of the end portion 511. And an inner diameter of the step region 512 is smaller than the inner diameter ID3 of the end portion 511.

The bearing housing 500 may include a step surface 530 in contact with an end of the shaft 100. The step surface 530 is one surface of the step region 512 and may be in contact with an end of the fourth region A4 of the shaft 100.

Meanwhile, the inner diameter of the end portion 511 of the bearing housing 500 is equal to the second outer diameter OD2 of the shaft 100. In addition, the outer diameter of the end portion 511 of the bearing housing 500 is equal to the second inner diameter ID2 of the rotor core 210. Accordingly, the fourth region A4 of the shaft 100 may be fitted to the end portion 511 of the bearing housing 500. In addition, the end portion 511 of the bearing housing 500 may be fitted to the second region A2 of the rotor core 210.

FIG. 8 is a set of views illustrating an assembly process of the shaft 100 and the rotor.

As illustrated in FIG. 8A, first, the bearing housing 500 is assembled with the shaft 100. The bearing housing 500 may be fitted to the fourth region A4 of the shaft 100, and a boundary area of the shaft 100 and the bearing housing 500 may be welded. Then, as illustrated in FIGS. 8B and 8C, the rotor 200 may be assembled with the shaft 100. A boundary area of the shaft 100 and the rotor 200 may be welded. In addition, the boundary area of the shaft 100 and the bearing housing 500 may be welded.

FIG. 9 is a side cross-sectional view illustrating a portion around the bearing housing 500 of the motor, and FIG. 10 is an enlarged view illustrating a region indicated by F of FIG. 9.

Referring to FIGS. 9 and 10, the bearing housing 500 is coupled to the rotor core 210 with the shaft 100 as well as the bearing 600. A part of the first part 510 of the bearing housing 500 is positioned inside the rotor core 210. Specifically, the inner ring 610 of the bearing 600 is in contact with the first surface S1 of the bearing housing 500. In addition, the second surface S2 of the bearing housing 500 is in contact with the inner circumferential surface of the rotor core 210.

The third surface S3 of the bearing housing 500 is in contact with the outer circumferential surface of the fourth region A4 of the shaft 100.

The end portion 511 of the bearing housing 500 is disposed between the rotor core 210 and the fourth region A4 of the shaft 100 in the radial direction.

Meanwhile, the housing 400 may include a sidewall 410 inside which a space for accommodating the bearing 600 is formed. The sidewall 410 is in contact with an outer ring 620 of the bearing 600 to fix the bearing 600. The housing 400 may include a folded portion 420 which is bent from the sidewall 410 and disposed on the sidewall 410 in a folded form. The folded portion 420 is disposed to overlap the insulator 320 and the coil 330 in the radial direction as illustrated in FIG. 1.

In addition, as the bearing 600 is disposed close to the rotor 200 in the axial direction, the bearing 600 is disposed between the bearing housing 500 and the coil 330 in the radial direction. Accordingly, a part of the bearing 600 may overlap a part of the coil 330 in the radial direction.

As described above, as the bearing housing 500 is disposed to overlap the rotor core 210 in the radial direction, there is an advantage that a length of the motor in the axial direction is reduced by a depth H to which the bearing housing 500 is inserted into the rotor core 210. As described above, when the length of the motor in the axial direction is reduced at one side end of the motor, there is an advantage of improving a degree of design freedom at the other side end of the motor.

The above-described embodiments can be used in various devices such as vehicles or home appliances.

The invention claimed is:

1. A motor comprising: a shaft; a rotor coupled to the shaft; a stator disposed to correspond to the rotor; a bearing housing coupled to the shaft; and a bearing which supports the bearing housing, wherein the rotor includes a rotor core and a magnet coupled to the rotor core, and the bearing housing includes a first surface in contact with the bearing, a second surface in contact with the rotor core, and a third surface in contact with the shaft, wherein the bearing housing includes an insertion region inserted between the shaft and the rotor core, and the insertion region overlaps the shaft in an axial direction and does not overlap the bearing in a direction perpendicular to the axial direction.

2. The motor of claim 1, wherein:
the shaft includes a first region having a first outer diameter and a second region having a second outer diameter smaller than the first outer diameter, and
the bearing housing includes an end portion disposed between the second region of the rotor core and the second region of the shaft.

3. The motor of claim 2, wherein:
an inner diameter of the end portion of the bearing housing is equal to the second outer diameter of the shaft; and
an outer diameter of the end portion of the bearing housing is equal to the second inner diameter of the rotor core.

4. The motor of claim 2, wherein the bearing housing includes a step region which extends from the end portion and has an outer diameter equal to an outer diameter of the end portion and an inner diameter smaller than an inner diameter of the end portion.

5. The motor of claim 1, wherein the stator includes a coil, wherein the bearing housing is disposed between the rotor core and the shaft, and wherein the bearing is disposed between the bearing housing and the coil.

6. The motor of claim 5, wherein a part of the coil and a part of the bearing overlap in a direction perpendicular to the axial direction.

7. The motor of claim 1, wherein the bearing housing includes a first surface in contact with the bearing, a second surface in contact with the rotor core, and a third surface in contact with the shaft, wherein the bearing housing includes an insertion region inserted between the shaft and the rotor core, and wherein the insertion region overlaps the shaft in an axial direction and does not overlap the bearing in a direction perpendicular to the axial direction.

8. The motor of claim 7, wherein:
the first surface and the second surface are an outer surface of the bearing housing; and
the third surface is an inner surface of the bearing housing.

9. The motor of claim 7, wherein the entire insertion region does not overlap the bearing in a direction perpendicular to the axial direction.

10. The motor of claim 7, wherein the rotor core includes a stopper which limits an insertion depth of the insertion region.

* * * * *